UNITED STATES PATENT OFFICE.

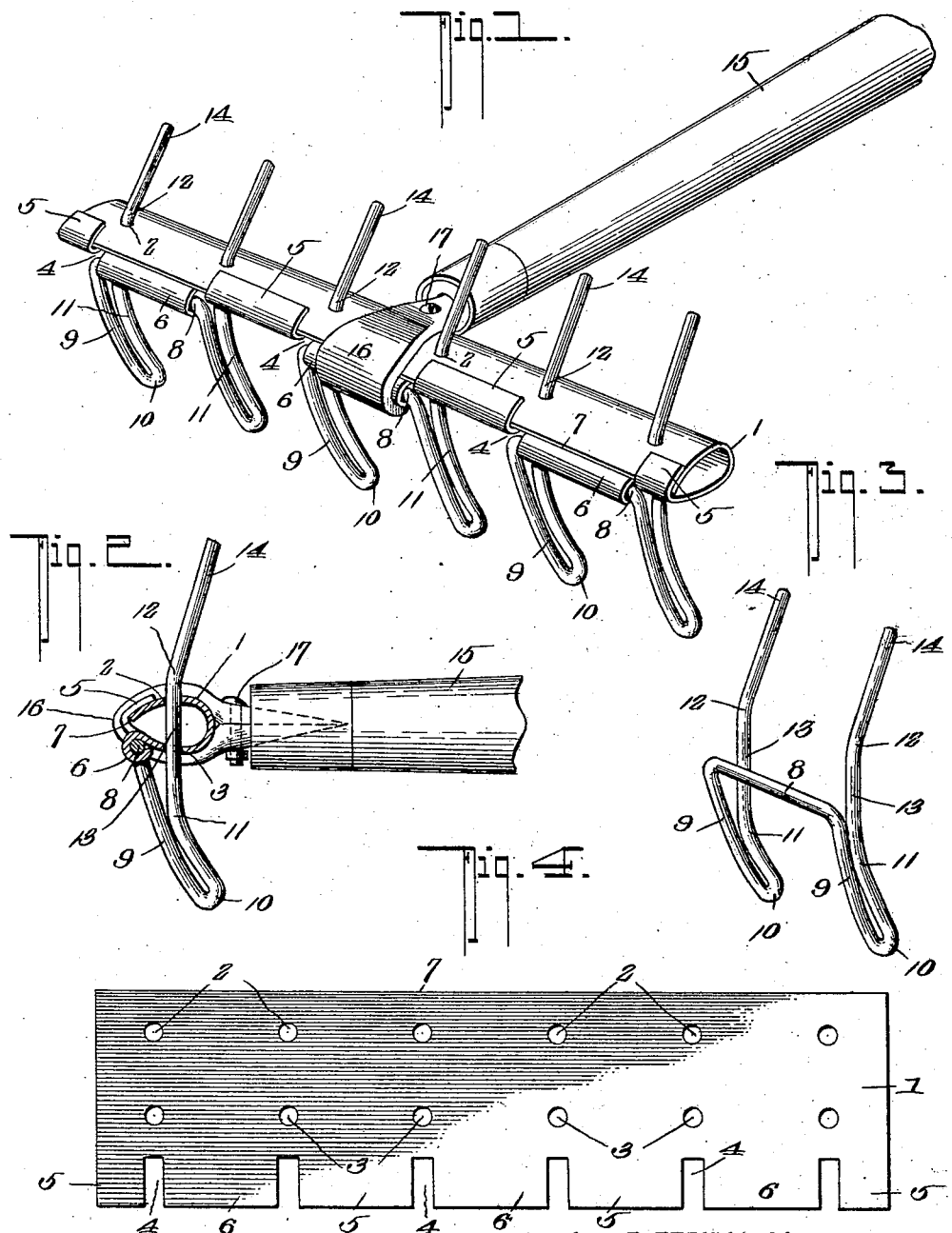

ROBERT H. WHITTED, OF CRAWFORDSVILLE, INDIANA.

RAKE.

No. 849,304.      Specification of Letters Patent.      Patented April 2, 1907.

Application filed August 8, 1906. Serial No. 329,755.

*To all whom it may concern:*

Be it known that I, ROBERT H. WHITTED, a citizen of the United States, residing at Crawfordsville, in the county of Montgomery and State of Indiana, have invented a new and useful Rake, of which the following is a specification.

My invention relates to rakes, and especially to rakes adapted for use in cultivating a garden and raking a lawn.

The object of my invention is to provide a rake possessing novel and improved features of cheapness, durability, and convenience.

A further object of my invention is to provide a rake having single teeth upon one side for use in scratching and cultivating and upon the other side folded teeth which will remove refuse from a lawn and the like without tearing up the roots of the grass.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit of the invention or sacrificing any of its advantages.

In the drawings, Figure 1 is a perspective view of my improved rake. Fig. 2 is a transverse sectional view of my improved rake. Fig. 3 is a perspective view of the tooth member of my improved rake. Fig. 4 is a plan view of the blank from which the cross-head of my improved rake is formed.

Like characters of reference designate corresponding parts throughout the several views.

In its preferred embodiment my improved rake is composed of a sheet of metal or other material 1, provided with a row of holes 2 adjacent one edge and a similar row of holes 3 parallel with the row of holes 2. Along one edge the sheet of metal is provided with a plurality of slots 4, forming the lips 5 and the alternately-disposed lips 6. The blank is then folded, as indicated in Figs. 1 and 2, and the lips 5 bent over the straight edge, as indicated, the adjacent holes of rows 2 and 3 registering.

A tooth member is formed of a wire having a straight central portion 8 and bent to form right-angularly-disposed arms 9 upon each side of the central portion 8. The arms 9 are then folded upon themselves at 10, with the folds in planes transverse to the central portion 8. The wire is then bent slightly, as at 11, away from the arm 9 and again at 12 to form the straight portion 13 and the free ends 14. The free ends 14 are passed through two of the holes 2 and 3 and the straight portion 13 engaged by the sheet metal. The lips 6 are folded about the straight portion 8 of the tooth member, as indicated in Figs. 1 and 2, securing the tooth to the head and with the single teeth 14 all upon one side of the head and alined and the folded teeth 10 upon the side of the head opposite the teeth 10 and also alined.

A handle 15 is secured to the head in any approved manner, as by the cup 16, clamped upon the head by the bolt 17.

From the foregoing description of the construction and assembling of the elements of my improved rake its use and operation, it is believed, will be fully and clearly understood.

Having thus described my invention, what I claim is—

1. In a rake, a cross-head, a tooth member secured to and parallel with the head and extended to form a tooth upon each of two sides of the head.

2. In a rake, a cross-head, a tooth member secured to and parallel with the head and extended to form a single tooth upon one side and a folded tooth upon the other.

3. In a rake, a cross-head composed of folded sheet material, and a tooth member secured to and parallel with the head and extended to form a tooth upon each of two sides of the head.

4. In a rake, a cross-head composed of folded sheet material, and a tooth member secured to and parallel with the head and extended to form a single tooth upon one side and a folded tooth upon the other.

5. In a rake, a cross-head, a tooth member secured to and parallel with the head and folded to form a tooth upon one side and passed through the head to form a single tooth upon the other side.

6. In a rake, a cross-head composed of folded sheet material, and a tooth member secured to and parallel with the head and folded to form a tooth upon one side and passed through the head to form a single tooth upon the other side.

7. In a rake, a cross-head composed of folded sheet material, and a tooth member secured to and parallel with the head by a fold of the material and folded to form a tooth upon one side and passed through the head to form a single tooth upon the other side.

8. In a rake, a cross-head composed of sheet material folded and held in such folded position by lips of the material, and a tooth secured to the head by a fold of the material between the lips.

9. In a rake, a cross-head composed of sheet material folded and held in such folded position by lips of the material, and a tooth member secured to and parallel with the head by a fold of the material embracing the tooth member.

10. In a rake, a hollow cross-head, a tooth member bent to form a folded tooth, and a single tooth, and a lip embracing and securing the tooth member to the head and with the folded tooth upon one side and the single tooth upon the other.

11. In a rake, a sheet of material folded to form a hollow cross-head, lips of the material arranged to hold the cross-head properly folded, a tooth passing through the head and folded to form a folded tooth upon one side, and a fold of the sheet material embracing and securing a portion of the tooth member parallel with the head.

12. In a rake, a tooth member composed of a wire, having a straight central portion, then bent upon each side into arms extending substantially at right angles to the central portion, the arms being then folded upon themselves, and the ends extended beyond the central portion with the folds in planes transverse to the central portion.

13. In a rake, a cross-head, a tooth member composed of a wire having a straight central portion, then bent upon each side into arms extending substantially at right angles to the central portion, the arms being then folded upon themselves and the free ends extended beyond the central portion with the folds in planes transverse, to the central portion, and means for securing the tooth member to the head.

14. In a rake, a sheet of material folded to form a cross-head, a tooth member composed of a wire having a straight central portion then bent upon each side into arms extending substantially at right angles to the central portion, the arms being then folded upon themselves and the free ends extended beyond the central portion with the folds in planes transverse to the central portion and with the free ends passed through the cross-head to form single teeth and with the folds opposite to form folded teeth, folds of the sheet material embracing the central straight portion of the tooth member, and a handle secured to the head.

In testimony that I claim the foregoing as my own I have hereto affixed my signature in the presence of two witnesses.

ROBERT H. WHITTED.

Witnesses:
  JOHN J. SLOAN,
  HOSEA H. RISTINE.